Dec. 3, 1968  R. L. PAIDOSH  3,414,739
DIGITAL PULSE SELECTION DEVICE FOR MONITORING
A VARIABLE CONDITION
Filed Jan. 13, 1966
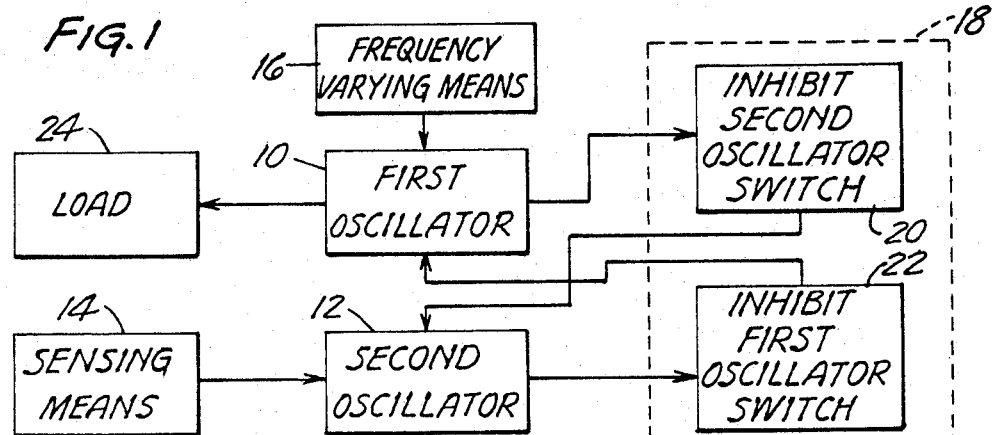
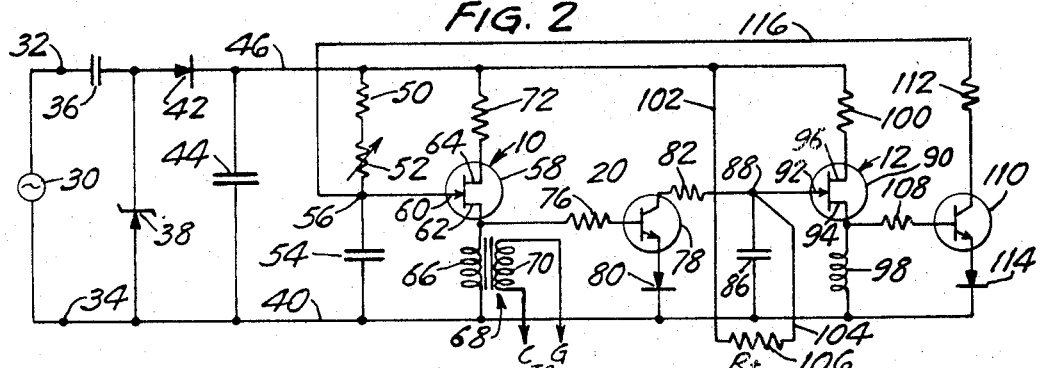
INVENTOR.
RICHARD L. PAIDOSH
BY
Carpenter, Kinney & Boulter
ATTORNEYS United States Patent Office 3,414,739
Patented Dec. 3, 1968

3,414,739
DIGITAL PULSE SELECTION DEVICE FOR
MONITORING A VARIABLE CONDITION
Richard L. Paidosh, Minneapolis, Minn., assignor to Minnesota Mining and Manufacturing Company, St. Paul, Minn., a corporation of Delaware
Filed Jan. 13, 1966, Ser. No. 520,408
14 Claims. (Cl. 307—271)

ABSTRACT OF THE DISCLOSURE

A digital pulse selection device is shown for monitoring a variable condition wherein the device includes a first oscillator which produces a first series of digital pulses at a fixed pulse repetition frequency and a second oscillator which is responsive to a sensing means for monitoring a variable condition and which produces a second series of digital pulses having a pulse repetition frequency which is a function of the sensing means and a switching means is responsive to the variable frequency of the second oscillator and when the frequency thereof is equal to or exceeds the frequency of the first oscillator disables operation of the first oscillator terminating the first series of digital pulses which represents that the monitored variable condition is equal to or exceeds a predetermined variable condition.

---

This invention relates to a pulse selection device and in one embodiment to a pulse selection device adapted for producing a series of digital pulses at a fixed pulse repetition frequency when a monitored variable condition is unequal to and does not exceed a predetermined variable condition and for terminating said digital pulses when said variable condition is detected to equal or exceed said predetermined condition.

Control devices for monitoring variables such as temperature and the like are known and have been used to monitor a process variable or an enviromental condition for control purposes. Such control devices have comprised solid state devices. A solid state device was disclosed in Patent No. 3,131,545 to K. E. Gross et al. entitled Control Device for Thermoelectric Means. The control device as described in the Gross et al. patent employed a thermistor to sense the temperature of a thermoelectric module. The thermistor was a part of an RC charging circuit. The time constant of the charging circuit varied as a function of the temperature sensed by the thermistor. The time constant of the RC charging circuit was used to control the operation of a firing control circuit comprising a unijunction transistor. The firing control circuit varied the electrical angle of conduction of an SCR transistor as a function of temperature. If the electrical angle of conduction of the SCR transistor exceeded 120°, a second unijunction transistor was made operative to disable operation of the firing control. Operation of such a control device required pulses which conditioned the SCR transistors in synchronism with the frequency of an alternating current (A.C.) source.

A disadvantage of such a control device is that operation thereof must be synchronized with an A.C. source supplying a load. Additionally, the amount of electrical energy supplied to the load is a function of the electrical angle of conduction of the SCR transistor.

The pulse selection device of the present invention overcomes the above described disadvantages. Operation of the pulse selection device of this invention is not dependent upon the frequency of an A.C. source. When the monitored variable condition equals or exceeds the predetermined variable condition, the output of digital pulses is terminated.

It is therefore an object of this invention to provide a pulse selection device which produces a series of digital pulses at a fixed pulse repetition frequency when a monitored variable condition is unequal to and does not exceed a predetermined variable condition.

An additional object of this invention is to provide a pulse selection device whose operation is independent of the frequency or voltage fluctuations of an A.C. source.

A further object of the present invention is to provide a pulse selection device capable of controlling a load with digital pulses.

The above and further objects of the present invention will become fully apparent when viewed in light of the following detailed description which refers to the accompanying drawings.

According to one embodiment of the present invention, the pulse selection device has a first oscillator having a fixed pulse repetition frequency for producing a first series of digital pulses. A sensing means is adapted for monitoring a variable. The sensing means has an electrical property which varies as a function of the monitored variable condition. A second oscillator is coupled to the sensing means and has a variable pulse repetition frequency for producing a second series of digital pulses. The variable frequency of the second oscillator is a function of the electrical property of the sensing means. The variable frequency of the second oscillator is selected to be lower than that of the first oscillator when the monitored variable condition is unequal to and does not exceed a predetermined variable condition. A switching means is operatively coupled to the first oscillator and the second oscillator for receiving the digital pulses. The switching means includes means which are responsive to the first received digital pulse of the first and second series of digital pulses. The switching means inhibits operation of the other oscillator to prevent generation of digital pulses. When the fixed frequency of the first oscillator is greater than the variable frequency of the second oscillator, the switching means disables the second oscillator permitting the first oscillator to produce its digital pulses. Conversely, when the variable frequency of the second oscillator is greater than that of the first oscillator, the switching means disables operation of the first oscillator terminating the first series of digital pulses. When the first oscillator is disabled terminating the output of digital pulses, the monitored variable condition is equal to or exceeds the predetermined variable condition.

FIGURE 1 is a block diagram diagrammatically illustrating the pulse selection device of the present invention;

FIGURE 2 is a schematic diagram diagrammatically illustrating one embodiment of the pulse selection device of FIGURE 1 wherein a switching means include two transistors;

FIGURE 3 is a schematic diagram diagrammatically illustrating another embodiment of FIGURE 1 of the present invention wherein a switching means comprises a single transistor; and FIGURE 4 is a schematic diagram diagrammatically illustrating yet another embodiment of FIGURE 1 of the present invention wherein a thermistor of lower impedance characteristics can be connected to the pulse selection device.

Referring now to the block diagram of FIGURE 1, the pulse selection device comprises a first oscillator designated generally as 10 and a second oscillator designated generally as 12. A transducer or sensing means 14 is employed for monitoring a variable or condition to be detected.

The first oscillator 10 includes a frequency varying means 16 which can be adjusted to fix the pulse repetition frequency of digital pulses produced by the first oscillator 10. The second oscillator 12 is connected to the sensing means 14. The second oscillator 12 produces digital pulses having a variable pulse repetition frequency and the pulse repetition frequency thereof varies as a function of the electrical property of the sensing means 14. The sensing means 14 may be, for example, an element whose electrical impedance varies as a function of the monitored variable condition.

First oscillator 10 and second oscillator 12 are connected to a switching means 18. Switching means 18 comprises an inhibit second oscillator switch 20 and an inhibit first oscillator switch 22. The inhibit second oscillator switch 20 is connected to receive digital pulses of a fixed frequency from the first oscillator 10. The output of the inhibit second oscillator switch 20 is connected to the second oscillator 12. The inhibit first oscillator switch 22 is connected to receive digital pulses of a variable frequency from the second oscillator 12. The output of the inhibit first oscillator switch 22 is connected to the first oscillator 10. Additionally, first oscillator 10 is connected to control a load 24 with digital pulses of a fixed pulse repetition frequency.

In operation, the sensing means 14 varies the pulse repetition frequency of the digital pulses produced by second oscillator 12 as a function of the monitored variable condition.

The frequency varying means 16 is adjusted to fix the pulse repetition frequency of the digital pulses produced by the first oscillator 10. A certain relationship between the pulse repetition frequency of the first oscillator 10 and second oscillator 12 must be maintained. The frequency varying means 16 is adjusted such that the fixed frequency of the digital pulses produced by the first oscillator 10 is equal to the frequency of the digital pulses produced by the second oscillator 12 when the monitored variable condition is equal to a predetermined variable condition.

If the monitored variable condition does not equal or exceed a predetermined variable condition, the pulse repetition frequency of the second oscillator 12 is lower than the pulse repetition frequency of the first oscillator 10. The second oscillator 12 will produce a digital pulse having a pulse repetition frequency which is lower than the pulse repetition frequency produced by the first oscillator 10. The switching means 18 will receive the digital pulse from the first oscillator 10 before the second oscillator 12 can produce its digital pulse. When this occurs, the inhibit second oscillator switch 20 is responsive to the first received digital pulse from the first oscillator 10 and disables operation of the second oscillator 12 from producing its digital pulse.

Conversely, when the monitored variable condition equals or exceeds the predetermined variable condition, the first oscillator 10 will be disabled by the switching means 18. When this relationship occurs, the pulse repetition frequency of the first oscillator 10 is lower than the pulse repetition frequency of the second oscillator 12. The first oscillator 10 will produce a digital pulse having a fixed pulse repetition frequency which is lower than the pulse repetition frequency produced by the second oscillator 12. The switching means 18 will receive the digital pulse from the second oscillator 12 before the first oscillator 10 can produce its digital pulse. The inhibit first oscillator switch 22 is responsive to the first received digital pulse from the second oscillator 12 and disables operation of the first oscillator 10 from producing its digital pulse.

FIGURE 2 is a circuit which provides an operation as described in the block diagram of FIGURE 1. A power converter section of the pulse selection device is energized by an A.C. power source 30 via terminals 32 and 34. The power converter rectifies an A.C. voltage into a D.C. voltage. A capacitor 36, functioning as a reactive current limiting device, has one side thereof connected in series circuit with the A.C. voltage source 30 via input terminals 32 and 34. The other side of capacitor 36 is connected to the cathode of a Zener diode 38. Zener diode 38 functions as a means for generating pulses of a predetermined magnitude and polarity at a pulse repetition frequency which is equal to that of the A.C. voltage. The anode of Zener diode 38 is connected to input terminal 34 via a ground conductor 40. The terminal connecting the other side of capacitor 36 to the cathode of Zener diode 38 is connected to a unidirectional, non-linear device, such as to the anode of a diode 42. The cathode of diode 42 is connected to one side of an integrating means such as, for example, to one side of a second capacitor 44. The other side of the capacitor 44 is connected to ground conductor 40.

In operation, the capacitor 36 limits the maximum current which can be supplied to the pulse selection device. The voltage appearing across capacitor 36 varies as a function of the A.C. voltage 30. The A.C. voltage normally applied to the capacitor 36 is 115 volts 60 cycles. The capacitor 36 applies the voltage to the Zener diode 38. Zener diode 38 conducts for only the positive portion of the A.C. pulse and clamps the voltage thereacross to a predetermined magnitude, for example 10 volts. Thus, the Zener diode 38 produces pulses having the predetermined magnitude, a positive polarity and at a fixed pulse repetition frequency which is equal to that of the A.C. voltage. Further, the generated pulses produced by Zener diode 38 are phase shifted approximately 90° relative to the A.C. voltage due to the reactive impedance of capacitor 36. The Zener diode 38 applies the pulses to second capacitor 44 through diode 42. However, when the Zener diode 38 is made non-conductive during the negative portion of the A.C. cycle, the diode 42 becomes backwardly biased to prevent the voltage appearing across capacitor 44 from discharging through Zener diode 38. The resultant constant D.C. voltage appearing across capacitor 44 is supplied to the pulse selection device.

The first oscillator of the pulse selection device, denoted generally as 10, receives electrical energy from the power converter via supply conductor 46 and the ground conductor 40. A resistor 50 has one side connected to the supply conductor 46 and the other side thereof connected to a variable potentiometer 52. The other terminal of potentiometer 52 is connected to one side of a capacitor 54 and the other side of capacitor 54 is connected to ground conductor 40. A unijunction transistor 58 having an emitter 60, a first base 62 and a second base 64, in combination with resistor 50, potentiometer 52 and capacitor 54, is used as the first oscillator 10. The emitter 60 is connected to a terminal point 56 located between the potentiometer 52 and the one side of capacitor 54. The other side of capacitor 54 is connected to the first base 62 via a primary winding 66 of a pulse transformer 68 and ground conductor 40. A secondary winding 70 of pulse transformer 68 is connected to a load, for example as to the cathode and gate of an SCR transistor (not shown). The second base 64 is connected through a resistor 72 to the supply conductor 46.

The first oscillator 10 produces digital pulses having a frequency which is representative of a predetermined variable condition. The frequency of the unijunction transistor 58 can be selectively varied by adjusting potentiometer 52. Potentiometer 52 can be adjusted such that the RC time constant of the circuit comprising resistor 50, potentiometer 52 and capacitor 54 is selectively determined fixing the pulse repetition frequency of the unijunction transistor 58.

The first base 62 is also connected through a resistor 76 to the base of an NPN transistor 78. The emitter of transistor 78 is connected via diode 80 to the ground conductor 40. The collector of transistor 78 is connected via a resistor 82 to the second oscillator designated generally as 12.

A capacitor 86 has one side thereof connected to the resistor 82 at a terminal point 88, and the other side of capacitor 86 is connected to ground conductor 40. A second unijunction transistor 90 having an emitter 92, a first base 94 and a second base 96 is used as part of second oscillator 12. The emitter 92 is connected at terminal point 88 to the resistor 82 and the capacitor 86. The first base 94 is connected through an inductor 98 to the ground conductor 40. The second base 96 is connected through resistor 100 to the supply conductor 46. A lead 102 from the supply conductor 46 and a lead 104 from the connecting terminal 88 are connected to a sensing means 14 for example a thermistor 106 which monitors the variable condition. The thermistor 106 has a resistance $R_t$ which varies as a function of the monitored variable condition. The resistance $R_t$ of the thermistor 106 when combined with the capacitance of capacitor 86 forms an RC time constant which varies the frequency of the unijunction transistor 90 as a function of the resistance $R_t$ of the thermistor 106.

The first base 94 is connected via a resistor 108 to the base of a second NPN transistor 110. The emitter of transistor 110 is connected to ground conductor 40 via diode 114. The collector of transistor 110 is connected via a resistor 112 and lead 116 to connecting point 56 located between the potentiometer 52 and capacitor 54 within the first oscillator 10.

In operation, supply conductor 46 applies the same potential to unijunction transistor 58 and 90. The RC time constant of the circuit comprising resistor 50, potentiometer 52 and capacitor 54 is selectively established by varying the resistance of potentiometer 52 such that unijunction transistor 58 oscillates at a frequency representing the predetermined variable condition. The unijunction transistor produces a digital pulse across primary winding 66 when the voltage level of capacitor 54 reaches the firing voltage of unijunction transistor 58. Each time unijunction transistor 58 is driven into conduction by capacitor 54, the digital pulse applied to the primary winding 66 of of pulse transformer 68 produces a digital pulse on the secondary winding 70 to control conduction of an SCR transistor. Concurrently, each time unijunction transistor 58 is driven into conduction, transistor 78 is driven into conduction. When transistor 78 is made conductive, capacitor 86 is discharged through resistor 82, the collector and emitter of transistor 78 and diode 80 to ground conductor 40. The pulse repetition frequency of the oscillations of unijunction transistor 90 is determined by the RC time constant of the circuit comprising the thermistor 106 and capacitor 86.

If the variable being detected is temperature and the predetermined variable condition is an equal or higher temperature, the resistance $R_t$ of thermistor 106 will decrease as the temperature increases. When this occurs, the RC time constant of the circuit will decrease. A decrease in the RC time constant of the circuit will make the pulse repetition frequency of the unijunction transistor oscillator higher. When the temperature is equal to or exceeds the predetermined variable condition, the pulse repetition frequency of the first oscillator 10 will be lower than that of the second oscillator 12. Unijunction transistor 90 will produce a digital pulse across inductor 98 before unijunction transistor 58 can produce a digital pulse across transformer 68. The digital pulse appearing across inductor 98 will drive transistor 110 into conduction. When transistor 110 is made conductive, terminal point 56 is directly connected to ground conductor 40 through lead 116, resistor 112, collector and emitter of transistor 110 and diode 114 to discharge capacitor 54.

Conversely, if the temperature being monitored is unequal to and does not exceed the predetermined variable condition, the RC time constant of the circuit comprising resistor 50, potentiometer 52 and capacitor 54 is less than the time constant of the circuit comprising thermistor 106 and capacitor 86. Capacitor 54 charges faster than the capacitor 86. Thus, unijunction transistor 58 will be driven into conduction before unijunction transistor 90. Transistor 78 will be driven into conduction when unijunction transistor 58 produces a digital pulse across primary winding 66 of transformer 68. Transistor 78, when conductive, connects capacitor 86 to ground conductor 40. When capacitor 86 is connected to ground conductor 40, the charge level on capacitor 86 is reduced substantially to zero thereby preventing unijunction transistor 90 from being driven into conduction. Unijunction transistor 58 conducts until the charge on capacitor 54 is substantially dissipated. When unijunction transistor 58 is made non-conductive, transistor 78 then becomes non-conductive. Capacitor 54 and capacitor 86 then charge again as a function of the RC time constant of their respective circuits. The circuit having the shortest RC time constant will drive its respective unijunction transistor into conduction. The first unijunction transistor driven into conduction will condition the switching means with a digital pulse. The switching means will respond to the digital pulse and inhibit operation of the other oscillator to prevent generation of its digital pulse.

The following are typical values of elements in the embodiment of FIGURE 2:

| Component— | Value |
| --- | --- |
| A.C. power source 30 | 85–220 volts, 60 cycle |
| Capacitor 36 | .5 µf. |
| Zener diode 38 | 1N4740A |
| Diode 42 | 1N2484 |
| Capacitor 44 | 200 µf. |
| Resistor 50 | 4.7KΩ |
| Potentiometer 52 | 0–5KΩ |
| Capacitor 54 | .1 µf. |
| Unijunction transistor 58 | 2N2646 |
| Pulse transformer 68 | Sprague 35ZM923 |
| Resistor 72 | 330Ω |
| Resistor 76 | 100Ω |
| NPN transistor 78 | 2N706 |
| Diode 80 | 1N914 |
| Resistor 82 | 10Ω |
| Capacitor 86 | .1 µf. |
| Unijunction transistor 90 | 2N2646 |
| Inductor 98 | 500 µh. |
| Resistor 100 | 330Ω |
| Thermistor 106 | Fenwal PG52P2 |
| Resistor 108 | 100Ω |
| NPN transistor 110 | 2N706 |
| Resistor 112 | 10Ω |
| Diode 114 | 1N914 |

The pulse repetition frequency of operation of the embodiment fo FIGURE 2 is in a range of about 500 cycles per second to about 10 kc. for the range of voltages indicated above. The range of frequency is selectable by varying the adjustment of potentiometer 52. Further, operation of the Zener diode 38 provides pulses of a fixed magnitude regardless of the input voltage level or fluctuation so that the range of frequency operation remains stable. The primary advantage of the pulse selection device, for example the embodiment of FIGURE 2, is that operation thereof is not synchronized with the line or input A.C. power source frequency. Additionally, at the end of each cycle, the entire circuit reverts back to a zero starting point. The zero starting point is obtained by the switching means 18. Switching means 18 is responsive to the first received digital pulse produced when one of the unijunction transistors is driven into conduction to inhibit operation of the other unijunction transistor.

The pulse selection device of FIGURE 3 is similar to that of FIGURE 2 except that the two NPN transistors 78 and 110 are replaced by a single NPN transistor 116 and two diodes 122 and 124. Lead 102 from thermistor 106 is connected between resistor 50 and potentiometer 52 rather than to supply conductor 46 as in FIGURE 2. Additionally, this circuit eliminates the inductor 98 between the first base 94 of unijunction transistor 90 and ground conductor 40. Capacitors 54 and 86 are connected to one end of a resistor 126 at terminal point 128 via leads 130 and 132 respectively. The other end of resistor 126 is connected to ground conductor 40. The collector of the transistor 116 is connected to the cathode of a first diode 122, and the anode of diode 122 is connected to terminal point 56 between potentiometer 52 and capacitor 54. The collector of transistor 116 is also connected to the cathode of a second diode 124, and the anode of diode 124 is connected to terminal point 88 located between capacitor 86 and lead 104. The base of transistor 116 is connected directly to ground conductor 40. The emitter of transistor 116 is connected to resistor 126 at terminal point 128. Such a circuit arrangement permits use of a thermistor having a lower impedance value as compared to the impedance value required for the thermistor of FIGURE 1.

In operation, when the RC time constant of the circuit comprising potentiometer 52 and capacitor 54 is less than that of the circuit comprising thermistor 106 and capacitor 86, unijunction transistor 58 is driven into conduction and produces a digital pulse. Thus, unijunction transistor 58 is driven into conduction before unijunction transistor 90 is driven into conduction. Prior to unijunction transistor 58 being driven into conduction, capacitors 54 and 86 both charge as a function of their respective circuits' RC time constants. Transistor 116 is non-conductive due to the polarity of the voltage appearing across resistor 126 as capacitors 54 and 86 are charging. Diode 122 would be forwardly biased and diode 124 would be backwardly biased.

When the charge on capacitor 54 reaches the firing voltage of unijunction transistor 58, the diode junction comprising emitter 60 and base 62 of unijunction transistor 58 becomes forwardly biased causing the charge stored in capacitor 54 to be dissipated. When unijunction transistor 58 is conductive, the charge on capacitor 54 will be substantially dissipated through the circuit including capacitor 54, emitter 60, base 62, primary winding 68 of transformer 70, ground conductor 40, resistor 126 and lead 130 back to capacitor 54. The voltage impressed across resistor 126 when capacitor 54 is discharging is of reversed polarity. The reversed polarity voltage forwardly biases the emitter-base junction of transistor 116 causing transistor 116 to become conductive. When transistor 116 is made conductive, the charge on capacitor 86 will be substantially discharged through a circuit including capacitor 86, diode 124, the collector and emitter of transistor 116 and lead 132. Transistor 116 remains conductive until the charge on capacitor 54 has been substantially dissipated. When transistor 116 becomes non-conductive, the capacitor 54 and capacitor 86 are substantially at zero charge level and begin to charge at a rate determined by the RC time constants of their respective circuits.

Conversely, when the monitored variable condition is at least equal to or exceeds the predetermined variable condition, the RC time constant of the circuit comprising the thermistor 106 and the capacitor 86 is less than that of the RC time constant of the circuit comprising potentiometer 52 and capacitor 54. Thus, unijunction transistor 90 would be driven into conduction before unijunction transistor 58. When this occurs, transistor 116 is made conductive by a voltage pulse of reversed polarity appearing across resistor 126 due to unijunction transistor 90 being driven into conduction. The charge on capacitor 54 would be substantially dissipated by the circuit comprising capacitor 54, diode 122, the collector and emitter of transistor 116 and lead 130.

FIGURE 4 illustrates an alternative embodiment of FIGURE 2 wherein the thermistor 106 is connected between connecting terminal 56 and 88. Such an arrangement connects the resistance $R_t$ of the thermistor in series with the resistor 50 and potentiometer 52. An adjustment of potentiometer 52 will change the RC time constant of both circuits. However, in this alternative embodiment, it is necessary that unijunction transistor 90 have an intrinsic stand-off ratio ($\eta$) which is somewhat less than that of unijunction transistor 58. This circuit also permits use of a thermistor having a lower impedance value relative to the impedance of the thermistor required in the circuit illustrated in FIGURE 2.

Having thus described the present invention, it is to be understood that various modifications will be apparent to one having ordinary skill in the art, and all such changes are contemplated as may come within the scope of the appended claims and any equivalents thereof.

What is claimed is:

1. A pulse selection device comprising
  (a) a first unijunction transistor having an emitter, a first base and a second base and capable of being driven into conduction and producing a first digital pulse;
  (b) a first capacitor operatively connected between the emitter and the first base of said first unijunction transistor, said first capacitor being capable of charging to a voltage level sufficient to drive said first unijunction transistor into conduction;
  (c) a resistor operatively connected between the emitter and the second base of said first unijunction transistor and in series circuit with said first capacitor, said resistor and said capacitor forming a circuit having a fixed time constant for driving said first unijunction transistor into conduction at a fixed pulse repetition frequency;
  (d) a thermistor adapted for monitoring a temperature, said thermistor having an inverse resistance versus time relationship which varies as a function of a temperature being monitored;
  (e) a second unijunction transistor having an emitter, a first base and a second base operatively connected to said thermistor, said thermistor being operatively connected between the emitter and the second base of said second unijunction transistor, said second unijunction transistor being capable of being driven into conduction and producing a second digital pulse;
  (f) a second capacitor operatively connected between the emitter and the first base of said second unijunction transistor, said second capacitor and said thermistor forming a circuit having a variable time constant for driving said second unijunction transistor into conduction at a variable pulse repetition frequency, said variable pulse repetition frequency being a function of the resistance of said thermistor varying as a function of the monitored temperature; and
  (g) a switching means operatively connected to said first unijunction transistor and said second unijunction transistor, said switching means including means responsive to the first one of said unijunction transistors being driven into conduction for inhibiting the operation of the other unijunction transistor to prevent said other unijunction transistor from being driven into conduction.

2. A pulse selection device as set forth in claim 1 wherein said switching means (g) includes
  (1) a first transistor operatively connected to the first base of said first unijunction transistor and to a terminal point between said second capacitor and the emitter of said second unijunction transistor; and
  (2) a second transistor operatively connected to the first base of said second unijunction transistor and to a terminal point between said first capacitor and the emitter of said first unijunction transistor;
  said first transistor being operative to discharge said second capacitor when the digital pulse first applied to said switching means is produced by said first unijunction transistor, said second transistor being operative to discharge said first capacitor when the digital pulse first applied to said switching means is produced by said second unijunction transistor.

3. A pulse selection device as set forth in claim 2 wherein said first and second transistors are NPN type transistors.

4. A pulse selection device as set forth in claim 1 wherein said switching means (g) includes
  (1) a first non-linear device operatively connected to a terminal point between said first capacitor, said resistor and the emitter of said first unijunction transistor, said first non-linear device being connected in a direction to conduct when said first capacitor accumulates a charge thereon;
  (2) a second non-linear device operatively connected to said first non-linear device and to a terminal point between said second capacitor, said thermistor and the emitter of said second unijunction transistor, said second non-linear device being connected in parallel with said first non-linear device and in a direction to conduct when said second capacitor accumulates a charge thereon; and
  (3) a transistor operatively connected in series to said parallelly connected first and said second non-linear devices, said transistor being operative to discharge said second capacitor through said second non-linear device when the digital pulse first applied to said switching means is produced by said first unijunction transistor, said transistor being operative to discharge said first capacitor through said first non-linear device when the digital pulse first applied to said switching means is produced by said second unijunction transistor.

5. A pulse selection device as set forth in claim 4 wherein said first and second non-linear devices are diodes and wherein said transistor is an NPN type transistor.

6. A pulse selection device as set forth in claim 1 wherein said thermistor (d) is operatively connected in series with said second capacitor and between the emitter and the second base of said second unijunction transistor through said resistor, and wherein said second unijunction transistor has an intrinsic stand-off ratio which is less than that of said first unijunction transistor.

7. A pulse selection device adapted for producing a series of digital pulses at a fixed frequency when a monitored variable condition is unequal to and does not exceed a predetermined variable condition and for terminating said digital pulses when said monitored variable condition equals or exceeds said predetermined variable condition, said device comprising
  (a) a first oscillator having a fixed pulse repetition frequency for producing a first series of digital pulses;
  (b) a sensing means adapted for monitoring a variable, said sensing means having an electrical property which varies as a function of the monitored variable condition;
  (c) a second oscillator coupled to said sensing means and having a variable pulse repetition frequency for producing a second series of digital pulses, said variable pulse repetition frequency being a function of the electrical property of said sensing means, said second oscillator pulse repetition frequency being lower than said first oscillator pulse repetition frequency when said monitored variable condition is unequal to and does not exceed said predetermined variable condition; and
  (d) switching means operatively connected to said first oscillator and said second oscillator and adapted for receiving said digital pulses, said switching means including means responsive to the first received digital pulse of said first and second series of said digital pulses for inhibiting operation of the other oscillator to prevent generation of its digital pulses.

8. A pulse selection device as set forth in claim 7 wherein said switching means (d) includes
  (1) a first transistor operatively connected to said first oscillator and capable of being made conductive in response to receiving a digital pulse from said first oscillator;
  (2) a second transistor operatively connected to said second oscillator and capable of being made conductive in response to receiving a digital pulse from said second oscillator; and
  (3) said first transistor being operative to inhibit operation of said second oscillator when the digital pulse first received by said switching means was produced by said first oscillator, said second transistor being operative to inhibit operation of said first oscillator when the digital pulse first received by said switching means was produced by said second oscillator.

9. A pulse selection device as set forth in claim 8 wherein said first and second transistors are NPN type transistors.

10. A pulse selection device as set forth in claim 7 wherein said switching means (d) includes
  (1) a first non-linear device operatively connected to said first oscillator, said first non-linear device being connected in a direction to conduct when said first oscillator produces each digital pulse of said first series of digital pulses;
  (2) a second non-linear device operatively connected to said second oscillator, said second non-linear device being connected in a direction to conduct when said second oscillator produces each digital pulse of said second series of digital pulses; and
  (3) a transistor operatively connected in parallel with said first and said second non-linear devices, said transistor being operative in response to one of said non-linear devices first made conductive by the oscillator producing the first digital pulse for inhibiting operation of the oscillator operatively connected to the non-conducting non-linear device to prevent generation of its digital pulses.

11. A pulse selection device as set forth in claim 10 wherein said first and said second non-linear devices are diodes and wherein said transistor is an NPN type transistor.

12. A pulse selection device adapted for controlling a load with digital pulses when a monitored variable condition is unequal to and does not exceed a predetermined variable condition and for terminating said digital pulses and control of said load when said monitored variable condition equals or exceeds said predetermined variable condition, said device comprising
  (a) a first unijunction transistor capable of being driven into conduction and producing first digital pulses to control said load;
  (b) a first capacitor operatively connected to said first unijunction transistor, said first capacitor being capable of charging to a voltage level sufficient to drive said first unijunction transistor into conduction;
  (c) a resistor operatively connected to said first unijunction transistor and in series circuit with said first capacitor, said resistor and said first capacitor forming a circuit having a fixed time constant for driving said first unijunction transistor into conduction to produce said first digital pulses at a fixed pulse repetition frequency;
  (d) a sensing means adapted for monitoring a variable, said sensing means having a resistance which varies as a function of the monitored variable condition;
  (e) a second unijunction transistor operatively connected to said sensing means, said second unijunction transistor being capable of being driven into conduction and producing second digital pulses;
  (f) a second capacitor operatively connected with said sensing means and said second unijunction transistor, said second capacitor and said sensing means forming a circuit having a variable time constant for driving said second unijunction transistor into conduction at a variable pulse repetition frequency, said variable pulse repetition frequency being a function of the resistance of said sensing means which varies as a function of the monitored variable condition; and (g) a switching means operatively connected to said first unijunction transistor and said second unijunction transistor, said switching means including at least one control transistor which is responsive to said first unijunction transistor being driven into conduction by said first capacitor for inhibiting the operation of said second unijunction transistor when the monitored variable condition is unequal to and does not exceed said predetermined variable condition, said control transistor being responsive to said second unijunction transistor being driven into conduction by said second capacitor for inhibiting the operation of said first unijunction transistor to terminate said first digital pulses and control of said load when said monitored variable condition is equal to or exceeds said predetermined variable condition.

13. The pulse selection device as set forth in claim 7 further comprising a power converter for converting an A.C. voltage to a D.C. voltage comprising (a) a reactive current limiting device operatively connected in series circuit with said A.C. voltage;

(b) means operatively connected in parallel with said series connected reactive current limiting device and said A.C. voltage for generating pulses of a predetermined magnitude, polarity and a pulse repetition frequency which is equal to that of said A.C. voltage, said generated pulses being of a predetermined magnitude and phase shifted approximately 90° relative to said A.C. voltage;

(c) a unidirectional non-linear conducting device operatively connected to said reactive current limiting device and said pulse generating means for receiving and conducting said generated pulses having a predetermined magnitude and polarity; and (d) means operatively coupled to said non-linear device for integrating said generated pulses of a predetermined magnitude applied thereto by said non-linear device, said integrating means producing a D.C. voltage thereacross.

14. The pulse selection device as set forth in claim 13 wherein said reactive current limiting device (a) is a first capacitor, said voltage establishing means (b) is a Zener diode, said unidirectional non-linear conducting device (c) is a diode and said integrating means (d) is a second capacitor.

No references cited.

ARTHUR GAUSS, *Primary Examiner.*

S. D. MILLER, *Assistant Examiner.*